United States Patent [19]
Berger et al.

[11] Patent Number: 6,048,618
[45] Date of Patent: Apr. 11, 2000

[54] IMPREGNATING COMPOUNDS FOR SELF-HEALING CAPACITORS

[75] Inventors: Noelle Berger, Ecully; Pierre Jay, Saint Didier Aux Monts D'Or, both of France

[73] Assignee: Elf Atochem S.A., France

[21] Appl. No.: 08/878,825

[22] Filed: Jun. 19, 1997

[30] Foreign Application Priority Data

Jun. 19, 1996 [FR] France ................................ 96 07631

[51] Int. Cl.$^7$ .............................. B32B 27/00; B32B 27/40

[52] U.S. Cl. ...................... 428/423.1; 252/575; 252/576; 361/29.42; 361/315; 427/79

[58] Field of Search ................ 252/574–6; 361/29.42, 361/315; 427/79, 80; 428/423.1

[56] References Cited

U.S. PATENT DOCUMENTS

| | | | |
|---|---|---|---|
| Re. 30,321 | 7/1980 | Brauer et al. | 528/361 |
| 3,925,221 | 12/1975 | Eustance | 252/63.7 |
| 4,060,583 | 11/1977 | Groves et al. | 264/272 |
| 4,317,159 | 2/1982 | Dequasie | 361/318 |
| 4,542,246 | 9/1985 | Matsunaga et al. | 252/575 X |
| 4,543,207 | 9/1985 | Sato et al. | 585/436 X |
| 4,594,642 | 6/1986 | Ito et al. | 252/576 X |

*Primary Examiner*—Michael Lusignan
*Attorney, Agent, or Firm*—Millen, White, Zelano & Branigan, P.C.

[57] ABSTRACT

The present invention relates to the use of insulating fluids, selected from the group consisting of aliphatic esters, alkylbenzenes, crosslinkable compositions comprising at least one polydiene polyol, at least one polyisocyanate and at least one chemically inert liquid charge, for the impregnation of the wound coils of self-healing capacitors.

30 Claims, 5 Drawing Sheets

IMPREGNATING COMPOUNDS FOR SELF-HEALING CAPACITORS

BACKGROUND OF THE INVENTION

The present invention relates to the field of electrical capacitors. More specifically, it relates to the use of certain insulating fluids for the impregnation of the wound coils of self-healing capacitors having metallized plates.

By self-healing capacitors is meant in the present context capacitors which include at least one plate consisting of a very thin layer of metal of a few hundred ångströms in thickness, the main property of which is that, when the capacitor breaks down, the said plate volatilizes at the point where the said breakdown occurs. This plate may either be a thin layer of metal, such as aluminium or zinc or an alloy of these two metals, deposited directly on a polymer film, such as polypropylene or polyester, which constitutes the solid dielectric, or may be deposited on both faces of a paper, this plate then being associated with one or more polymer films which act as a dielectric. In the latter case, the doubly-metallized paper does not act as a dielectric.

The wound coils of these capacitors are advantageously impregnated with an insulating fluid. Impregnation typically takes place after the solid materials have been wound, by introducing, under reduced pressure, an insulating fluid which, at the time of impregnation, is in the form of a low-viscosity liquid. Once the impregnation has been completed, the capacitors may undergo a heat treatment. This is necessary when the insulating fluid consists of systems having 2 polycondensable and/or crosslinkable components which are to a greater or lesser extent charged with an inert liquid so as to minimize the shrinkage.

It has been observed that, when the impregnation of the metallized polymer films of the wound coils for self-healing capacitors is carried out using certain aromatic liquids, such as mixtures of mono- and dibenzyltoluene, phenylxylylethanes, the said capacitors have a very short lifetime under voltage.

SUMMARY OF THE INVENTION

It has now been discovered that it is possible to use, for the impregnation of the metallized polymer films of the wound coils for self-healing capacitors, at least one insulating fluid selected from the group consisting of aliphatic esters, alkylbenzenes, crosslinkable compositions comprising at least one polydiene polyol, at least one polyisocyanate and at least one chemically inert liquid charge.

Regarding the aliphatic esters, the compounds used in the present invention are preferably dioctyl sebacate, dioctyl adipate, dibutyl sebacate and diethyl succinate.

Among these compounds, dibutyl sebacate is most particularly preferred.

Regarding the crosslinkable compositions which can be used according to the present invention, it is preferred to use those which comprise at least one polydiene polyol, at least one polyisocyanate having a functionality greater than 2 and a quantity of inert liquid charge at least equal to 80% by weight of the composition so as to maintain a viscosity of less than 100 mPa.s throughout the duration of the impregnation.

The chemically inert liquid charge is an insulating liquid, which can completely dissolve the polydiene polyols and the polyisocyanates and is selected from alkylbenzenes, such as decylbenzenes and dodecylbenzenes; dielectric esters which are, for example, products of the reaction of polyvalent alcohols, such as pentaerythritol, with monovalent carboxylic acids, such as n-heptanoic acid; aliphatic esters, such as dioctyl sebacate, dioctyl adipate and dibutyl sebacate; alkyl phthalates, such as dibutyl phthalate and dioctyl phthalate; alkylpolyaromatic compounds, such as monoisopropylbiphenyl (MIPB); vegetable oils, such as colza oils, maize oils and soya oils, as well as the combination of at least two of the abovementioned insulating liquids.

Preferably, aliphatic esters, such as dibutyl sebacate and dioctyl adipate, alkyl phthalates, such as dioctyl phthalate, or vegetable oils, such as colza oil, will be used as the chemically inert liquid charge.

The polyisocyanate used to produce the usable crosslinkable composition according to the present invention may be selected from aromatic, aliphatic and cycloaliphatic polyisocyanates and those polyisocyanates which contain in their molecule an isocyanurate ring, having at least two isocyanate functional groups in their molecule, these being able to react with hydroxyl functional groups of a polyol in order to form a three-dimensional polyurethane network causing the composition to gel.

By way of illustration of aromatic polyisocyanates, mention will be made of 4,4'-diphenylmethane diisocyanate (MDI), polymeric MDIs and triphenylmethane triisocyanate.

By way of illustration of an aliphatic polyisocyanate, mention may be made of the biuret of 1,6-diisocyanatohexane:

By way of illustration of cycloaliphatic polyisocyanates, mention may be made of isophorone diisocyanate (IPDI), cyclohexyl diisocyanate (CHDI) and 4,4'-dicyclohexylmethane diisocyanate.

By way of illustration of polyisocyanates which contain in their molecule the isocyanurate ring, mention may be made of the trimers of hexamethylene diisocyanate which are sold by Rhône-Poulenc under the name TOLONATE HDT and tris[1-(isocyanatomethyl)-1,3,3-trimethylcyclohexane] isocyanurate sold by Hüls under the name VESTANAT T 1890/100.

The amount of polyisocyanate is chosen in such a way that the NCO/OH molar ratio is about 1 and is preferably between 0.85 and 1.15.

The polydiene polyol is a hydroxytelechelic conjugated-diene oligomer which may be obtained by various processes, such as the radical polymerization of a conjugated diene having from 4 to 20 carbon atoms in the presence of a polymerization initiator, such as hydrogen peroxide, or an azo compound, such as 2,2-azobis[2-methyl-N-(2-hydroxyethyl)propionamide], or the anionic polymerization of a conjugated diene having from 4 to 20 carbon atoms in the presence of a catalyst, such as dilithium naphthalene.

According to the present invention, the conjugated diene of the polydiene polyol is selected from the group comprising butadiene, isoprene, chloroprene, 1,3-pentadiene and cyclopentadiene.

It is also possible to use hydroxytelechelic oligomers of conjugated dienes which are epoxidized along the chain, as well as hydroxytelechelic hydrogenated oligomers of conjugated dienes.

The polydiene polyols may have number-average molar masses at most equal to 7000 and preferably of between 1000 and 3000. They have functionalities ranging from 1.8 to 3 and a dynamic viscosity measured at 30° C. at least equal to 600 mPa.s.

By way of illustration of polydiene polyols, mention may be made of the hydroxylated polybutadienes sold by Elf Atochem S.A. under the names PolyBd® 45 HT and PolyBd® 20 LM.

The crosslinkable composition may comprise, in addition to the polydiene polyol, one or more polyols of low molar mass.

By polyols of low molar mass are meant polyols having molar masses ranging from 50 to 800.

By way of illustration of such polyols, mention may be made of ethylene glycol, propylene glycol, diethylene glycol, dipropylene glycol, polyetherpolyols, 1,4-butanediol, 1,6-hexanediol, 2-ethyl-1,3-hexanediol, N,N-bis(2-hydroxypropyl)-aniline, 3-methyl-1,5-pentanediol, trimethylolpropane, pentaerythritol, propoxylated bisphenol A sold by Akzo under the name DIANOL 320, and the mixture of at least two aforementioned polyols.

In the case in which a polyol of low molar mass is used, the NCO/OH molar ratio will have to be calculated taking into account the hydroxylated functional groups provided by the said polyol of low molar mass.

Although the use of a catalyst is not absolutely essential, it will be possible, in some cases, if desired, to use a catalyst of the organometallic type, such as dibutyltin dilaurate, dibutyltin acetate or organic derivatives of bismuth.

The usable crosslinkable composition according to the present invention may be produced by mixing, at room temperature (approximately 20° C.), the various constituents using any means of stirring sufficient to ensure good dispersion of the constituents. The crosslinkable composition may also contain one or more additives, such as antioxidants, an epoxide or anthraquinone.

The inert charge may optionally undergo a dielectric treatment on an adsorbent earth.

The wound coils impregnated by means of the insulating fluids according to the present invention have the advantage of withstanding high voltage gradients.

In the case of the crosslinkable compositions, the capacitors obtained furthermore have the advantage of no longer having free liquid capable of contaminating the environment should there be a leak.

In addition, this absence of free liquid gives the capacitors improved fire-resistance properties because there is no possibility of burning liquid being projected should the capacitor explode.

The examples which follow illustrate the invention.

I. Metallized-film capacitors

Data relating to the capacitors

The wound coils are manufactured from a rough polypropylene film which is vacuum-metallized using an aluminium/zinc alloy sold by Bolloré under the name PP3M.

The film has a thickness (by weight) of 7.6 µm.

The round wound coils are sprayed with zinc using the Schoop process in order to allow them to be connected.

The wound coils are placed in crimped cylindrical cases.

Preparation of the capacitors

Before impregnation, the capacitors undergo treatment for 4 hours at 115° C. followed, after returning to room temperature, by an electrical treatment in order to eliminate, from the wound coil before impregnation, the main weak points in the metallized film. This treatment is carried out by rapidly discharging a 30 µF capacitor, charged beforehand at 150 V DC, into each wound coil.

Insulating fluids used:

dibutyl sebacate (hereafter referred to as DBS) having a viscosity at 20° C. equal to 3.9 mPa.s;

dioctyl sebacate (hereafter referred to as DOS) having a viscosity at 20° C. equal to 22.4 mPa.s;

dioctyl adipate (hereafter referred to as DOA) having a viscosity at 20° C. equal to 14.1 mPa.s;

Jarylec C100 (hereafter referred to as JARYLEC) consisting of 75% by weight of benzyltoluenes and of 25% by weight of (benzyl)benzyltoluenes having a viscosity at 20° C. of 6.5 mPa.s.

The crosslinkable compositions were prepared using the following constituents:

PolyBd® 45 HT (hereafter referred to as PolyBd), namely a hydroxylated polybutadiene of $\overline{M}_n$ equal to 2800 (determined by steric exclusion chromatography), having a hydroxyl number $I_{OH}$ expressed in milliequivalents per gram (meq/g) equal to 0.83, a viscosity equal to 5000 mPa.s at 30° C. and a relative density equal to 0.90;

Tolonate HDT/LV (hereafter referred to as Tolonate), namely tris(6-isocyanatohexyl) isocyanurate, having an NCO content equal to 23%, a functionality of approximately 3.4 and a viscosity at 25° C. equal to 1200 (±300) mPa.s;

colza oil of food-grade quality, having a viscosity at 20° C. equal to 69.5 mPa.s;

DBS;

JARYLEC.

Preparation of the crosslinkable compositions:

Crosslinkable compositions comprising colza oil as the inert charge

The colza oil is treated beforehand with attapulgite. To do this, the colza oil plus 3% by weight of attapulgite are mixed at 60° C. for 4 hours, filtered under reduced pressure and then degassed at 60° C.

TOLONATE is dissolved in the treated colza oil at 60° C., PolyBd and DBTL, as catalyst, are added and then the mixture is degassed under reduced pressure at 60° C.

Crosslinkable compositions comprising DBS as inert charge

TOLONATE is dissolved at room temperature in DBS treated with attapulgite according to the protocol described above in the case of colza oil, the mixture is heated to 60° C., PolyBd and DBTL are added and the mixture degassed under reduced pressure at 60° C.

Crosslinkable compositions comprising JARYLEC as inert charge (not in accordance with the invention)

Dissolved separately in Jarylec are, on the one hand, PolyBd (mixture A) and, on the other hand, Tolonate (mixture B). To each of the mixtures, A and B, are added 3 g of attapulgite per 100 g of mixture, the mixtures are stirred separately at room temperature for 3 hours and then the mixtures are filtered under reduced pressure. Next, mixture A and mixture B are brought into contact with each other in a glass reactor provided with stirring.

Impregnation of the capacitors

If the insulating fluid is a crosslinkable composition, this composition is introduced into the capacitors under reduced pressure at 60° C. Next, the capacitors are held at 60° C. for 3 days and then heated to 90° C. and held at this temperature for 9 days in order to gel.

If the insulating fluid is DBS, DOS, DOA or JARYLEC, the said fluid is introduced into the capacitors under reduced pressure at room temperature, then the capacitors are heated to 60° C., which temperature is maintained for 3 days, and then the capacitors are heated to 90° C., which temperature is maintained for one day.

DETAILED DESCRIPTION OF THE FIGURES

Ageing under increasing DC voltages

We carried out tests under voltage. For these tests, the capacitors are subjected to DC voltages which increase in steps every 24 hours.

The temperature is maintained at 60° C. throughout the duration of the test. (During the weekends, the voltage is brought back down to the level of the first step (1200 V=160 V/$\mu$m)).

The lifetimes of the capacitors are evaluated in the form of curves of capacitance=f (voltage gradient), which are plotted in FIGS. 1 to 7. In these figures, we have shown as ordinates the change in capacitance C, expressed in $\mu$F, at 60° C. and as abscissae the voltage gradient, expressed in V/$\mu$m.

In Table 1 below, we have indicated for each test:

the nature of the insulating impregnation fluid:

liquids such as Jarylec, DBS, DOA and DOS⇒Tests 1 to 8, crosslinkable compositions⇒Tests 9 to 14, (the percentage of the constituents of the crosslinkable compositions are percentages by weight);

the number of the figure and the symbol used to represent the corresponding curve.

In this table, NC means "not according to the invention".

The test is continued until the capacitor breaks down or is stopped when the drop in capacitance becomes too great.

TABLE 1

| TEST | INSULATING IMPREGNATION FLUID LIQUIDS | FIGURE No. | CURVE REPRESENTED BY: |
|---|---|---|---|
| 1 (NC) | JARYLEC | 1 | —●— |
| 2 (NC) | JARYLEC | 1 | —○— |
| 3 | DBS | 2 | —●— |
| 4 | DBS | 2 | —○— |
| 5 | DOA | 3 | —●— |
| 6 | DOA | 3 | —○— |
| 7 | DOS | 4 | —●— |
| 8 | DOS | 4 | —○— |

Figure 1:
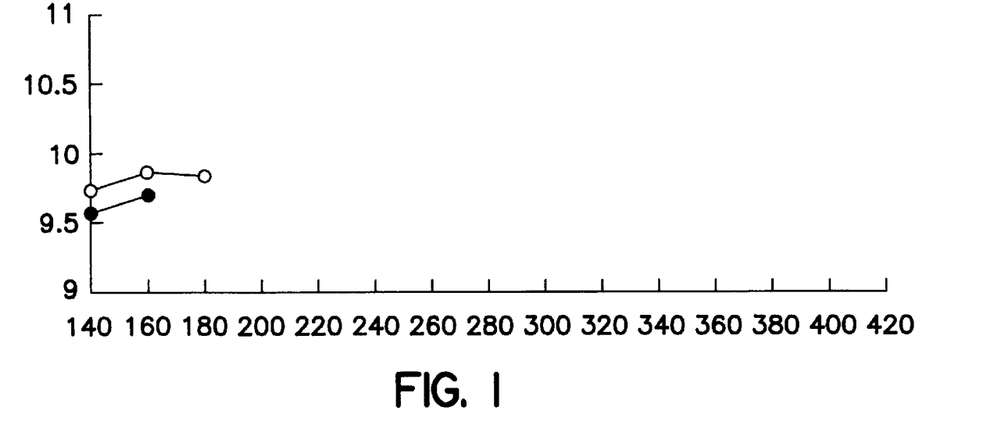
FIGS. 1, 2, 3, 4, 5, 6 and 7 are graphs of aging tests under increasing DC voltages of the life times of the capacitors.
Figure 2:
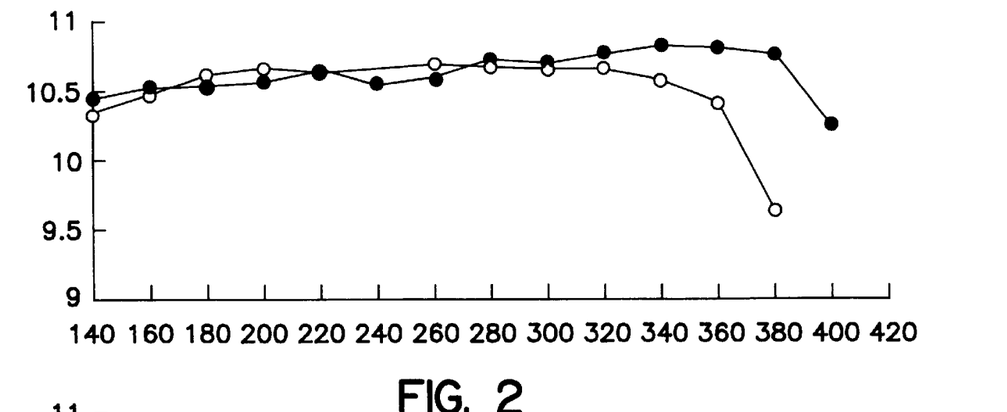
Figure 3:
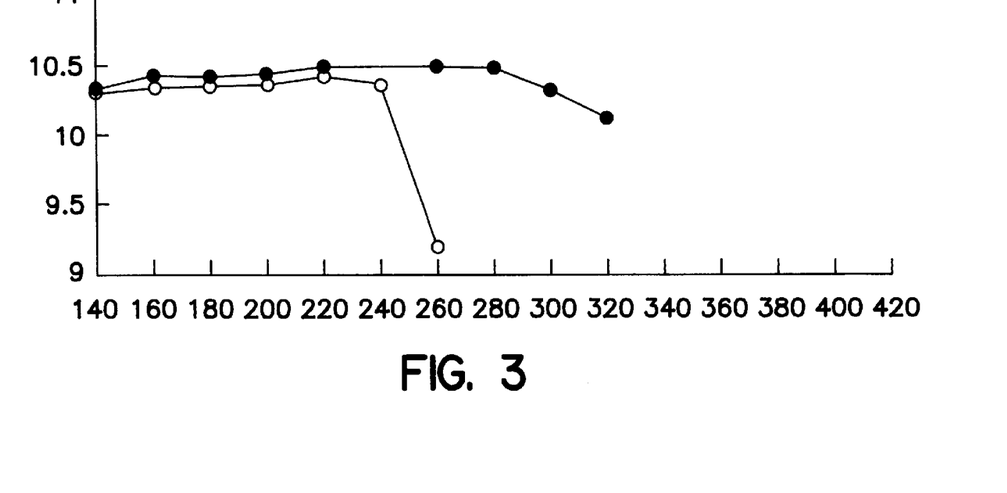
Figure 4:
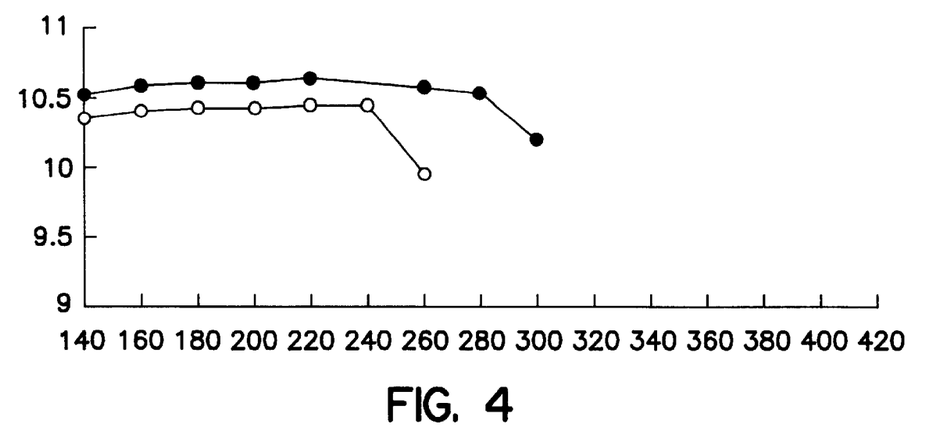
Figure 5:
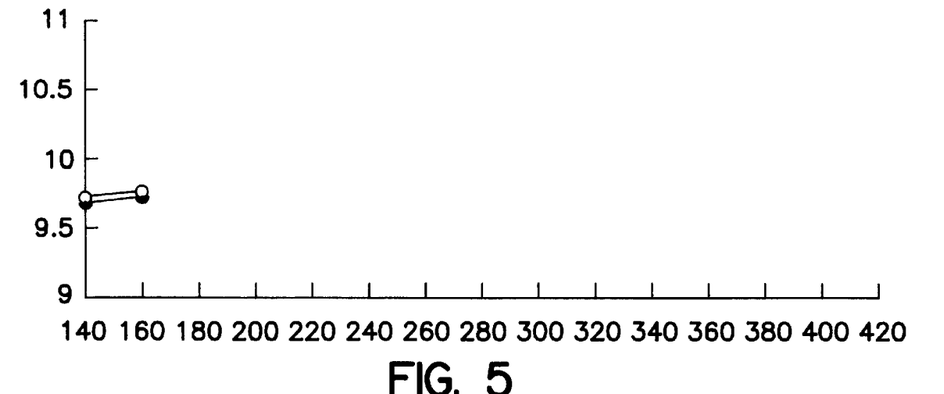
Figure 6:
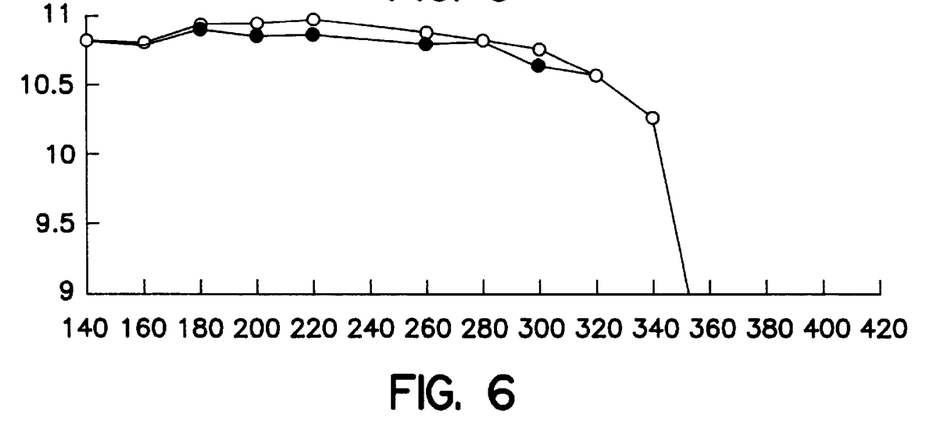
Figure 7:
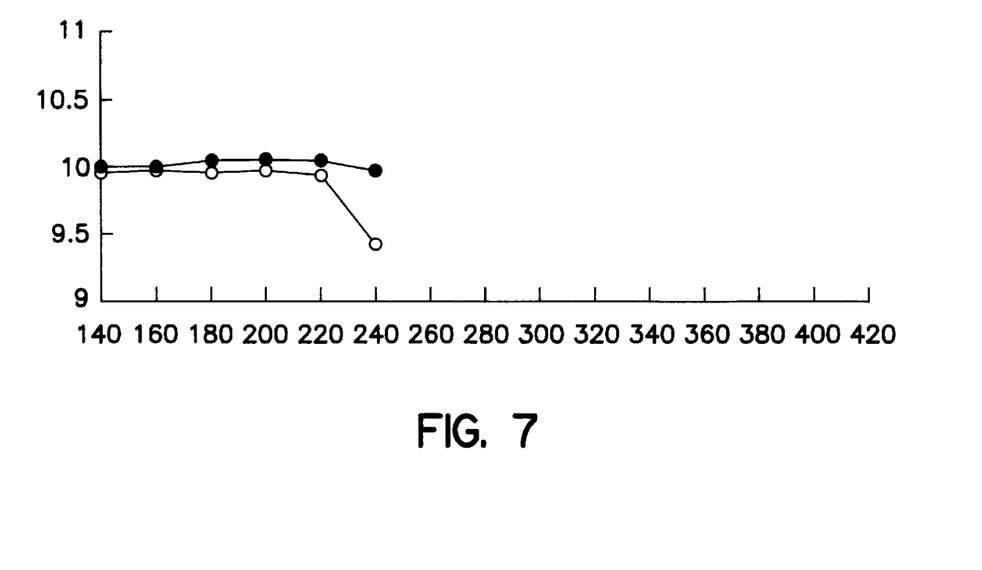

| | CROSSLINKABLE COMPOSITIONS | | | | | | | |
|---|---|---|---|---|---|---|---|---|
| | Jarylec (%) | DBS (%) | Colza (%) | Tolonate (%) | PolyBd (%) | DBTL (%) | | |
| 9 (NC) | 94 | | | 1 | 5 | | 5 | —●— |
| 10 (NC) | 94 | | | 1 | 5 | | 5 | —○— |
| 11 | | 93.60 | | 0.85 | 5.5 | 5 | 6 | —●— |
| 12 | | 93.60 | | 0.85 | 5.5 | 5 | 6 | —○— |
| 13 | | | 91.5 | 1.2 | 7.3 | 20 | 7 | —●— |
| 14 | | | 91.5 | 1.2 | 7.3 | 20 | 7 | —○— |

II Capacitors of the MKV type

Data on the capacitors

We used MKV capacitors in which the solid dielectric is a polypropylene film 10 $\mu$m in thickness and the plate is a paper metallized with zinc on both sides. Their rated capacitance is 6 $\mu$F and they are intended to be installed under 660 V AC.

Insulating fluid used:

dioctyl phthalate (hereafter referred to as DOP) having a viscosity at 20° C. equal to 80 mPa.s.

The crosslinkable compositions were prepared using the following constituents:

DOP;
dodecylbenzene (hereafter referred to as D9);
JARYLEC;
Tolonate;
PolyBd;
DBTL.

The DOP and the crosslinkable compositions were prepared according to the following protocol:

Preparation of the DOP

DOP with 3% by weight of attapulgite is stirred at 60° C. for 4 hours, filtered under reduced pressure and then degassed under reduced pressure at 60° C.

Crosslinkable compositions comprising DOP as the inert charge

Dissolved separately in DOP are, on the one hand, PolyBd (mixture A) and, on the other hand, Tolonate (mixture B). 3% of attapulgite is added to each of the mixtures and these mixtures are stirred overnight at 60° C. Each mixture is then filtered and degassed. Next, the mixtures are brought into contact with each other in a stirred glass reactor.

Crosslinkable compositions comprising a D9/DOP mixture as the inert charge

A solution containing, by weight, 80% of D9 and 20% of DOP is prepared. Dissolved separately in this solution are, on the one hand, PolyBd (mixture A) and, on the other hand, Tolonate (mixture B). 3% of attapulgite is added to each of the mixtures and these mixtures are stirred overnight at 60° C. Each mixture is then filtered and degassed. Next, the mixtures are brought into contact with each other in a stirred glass reactor.

Crosslinkable compositions comprising a DOP/JARYLEC mixture as the inert charge

A solution containing, by weight, 50% of DOP and 50% of JARYLEC is prepared. Dissolved separately in this solution are, on the one hand, PolyBd (mixture A) and, on the other hand, Tolonate (mixture B). 3% of attapulgite is added to each of the mixtures and these mixtures are stirred overnight at 60° C. Each mixture is then filtered and degassed. Next, the mixtures are brought into contact with each other in a stirred glass reactor.

Capacitor impregnation conditions.

If the insulating fluid is a crosslinkable composition, this composition is introduced into the capacitors (dried beforehand at 100° C. under reduced pressure) at 60° C. under reduced pressure. Next, the capacitors are heated to 90° C. and are held at this temperature for 10 days.

If the insulating fluid is a liquid such as DOP, the said fluid is introduced into the capacitors (dried beforehand at 100° C. under reduced pressure) at 60° C. under reduced pressure and then the capacitors are heated to 90° C. and held at this temperature for 6 days.

Ageing test under AC voltage.

The capacitance of the capacitors was measured at 70° C.

The capacitors were then subjected to an ageing test at 70° C. under a voltage of 825 V.

During this test, the capacitance and the losses of each element were regularly measured.

After 1077 hours, the voltage was raised to 910 V. The test was stopped after 203 hours under this voltage.

Figure 8:
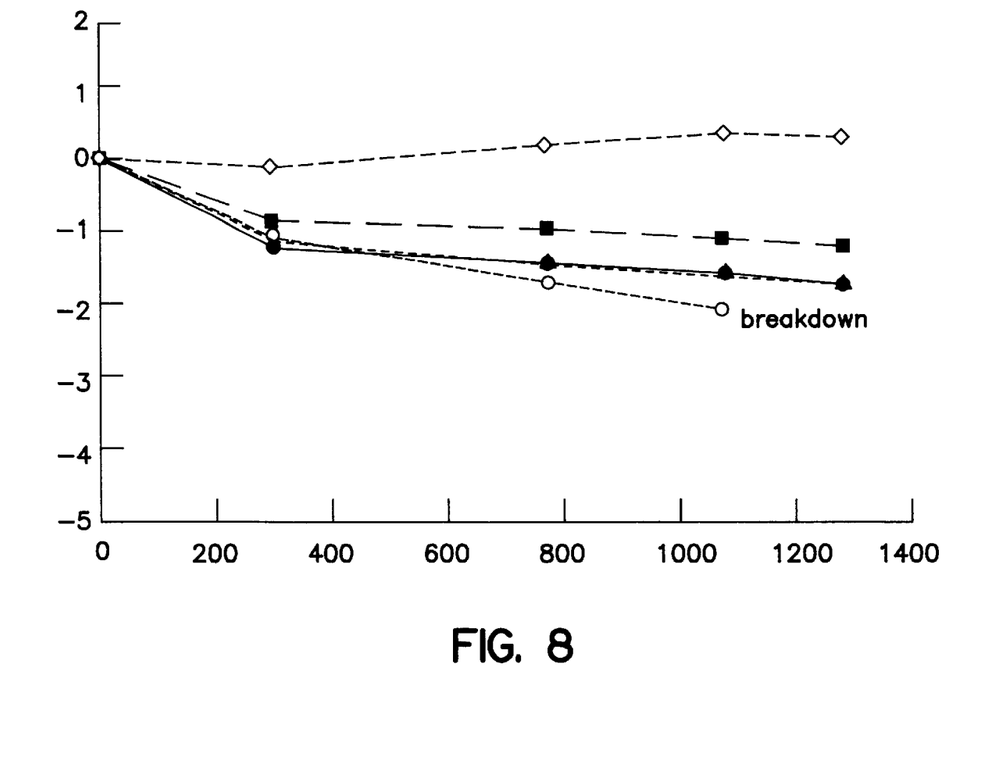
FIG. 8 is an aging test of the capacitors under AC voltage.

The results are plotted in FIG. 8.

In this figure, we have shown as ordinates the variation in the capacitance, ΔC/C, in % and as abscissae the time in hours.

In Table 2 below, we have indicated for each test:
the nature of the insulating impregnation fluid:
DOP⇒Test 15 crosslinkable compositions⇒Tests 16 to 19 (the percentages of the constituents of the crosslinkable compositions are percentages by weight);

the symbol used to represent the curve ΔC/C=f(time), corresponding to each test, plotted in FIG. 8.

In this table, NC means "not in accordance with the invention".

TABLE 2

| TEST | INSULATING IMPREGNATION FLUID LIQUIDS | | | | | | FIGURE No. | CURVE ΔC/C = F(T) REPRESENTED BY: |
|---|---|---|---|---|---|---|---|---|
| 15 | DOP | | | | | | 8 | --+-- |
| | CROSSLINKABLE COMPOSITIONS | | | | | | | |
| | Jarylec (%) | DOP (%) | D9 (%) | Tolonate (%) | PolyBd (%) | DBTL (%) | | |
| 16 | | 94 | | 0.8 | 5.2 | 3 | 8 | —●— |
| 17 | | 92 | | 1.1 | 6.9 | | 8 | —■— |
| 18 | | 18.7 | 77.4 | 0.88 | 5.72 | 3 | 8 | —◊— |
| 19 (NC) | 47 | 47 | | 0.8 | 5.2 | 5 | 8 | ---o--- |

The capacitors impregnated with a JARYLEC/DOP mixture—Test 19—broke down 5 hours after applying a voltage of 910 V.

No breakdown was observed in the case of the other capacitors.

III Metallized-film capacitors

Data relating to the capacitors

The wound coils are manufactured using aluminium-metallized polypropylene film sold by Bolloré under the name PP2. The "crenellated" metallization of this film has a surface resistance of 2 Ω/□.

The film has a thickness, by weight, of 7.4 μm.

The flattened wound coils are sprayed with zinc using the Schoop process in order to allow them to be connected and are placed, in groups of twos, in parallelepipedal cases.

Insulating fluids used:
Jarylec C100 (hereafter referred to as C100);
dibutyl sebacate (hereafter referred to as DBS);
dodecylbenzene (hereafter referred to as D9);
dioctyl phthalate (hereafter referred to as DOP).

These liquids were treated beforehand with 3% of activated attapulgite overnight, with stirring, at 20° C. and then filtered and degassed under reduced pressure.

Crosslinkable compositions

They were obtained by adding PolyBd and Tolonate to the insulating liquid.

Impregnation of the capacitors

Before impregnation, the capacitors undergo a 48-hour treatment at 70° C., under reduced pressure, and are then cooled down to room temperature (approximately 20° C.). The impregnation is carried out under reduced pressure. After the impregnation has been completed, the capacitors are brought back to atmospheric pressure and left at room temperature for approximately one week. Next, they are subjected to a 60° C. heat treatment for at least one week.

Ageing of the capacitors under DC voltage

We carried out tests in which the capacitors are subjected to DC voltages increasing in steps every 24 hours (during the weekends, the voltage is brought back down to the level of the first step). The temperature is maintained at 55° C.

throughout the duration of the test. This is stopped when the drop in capacitance becomes too great. The capacitance of the wound coils is measured at the end of each step. The lifetimes of the capacitors are evaluated in the form of curves, of capacitance=f(voltage gradient), which are plotted in FIGS. 9 to 11 below. In these figures, we have shown as abscissae the voltage gradient, expressed in V/μm, and as ordinates the variation in the capacitance, ΔC/C, expressed in %.

In Table 3, we have indicated for each test:
the nature of the impregnating compound;
the number of the figure;
the symbol used to represent the corresponding curve.
In this table, NC means "not in accordance with the invention".

TABLE 3

Figure 9:
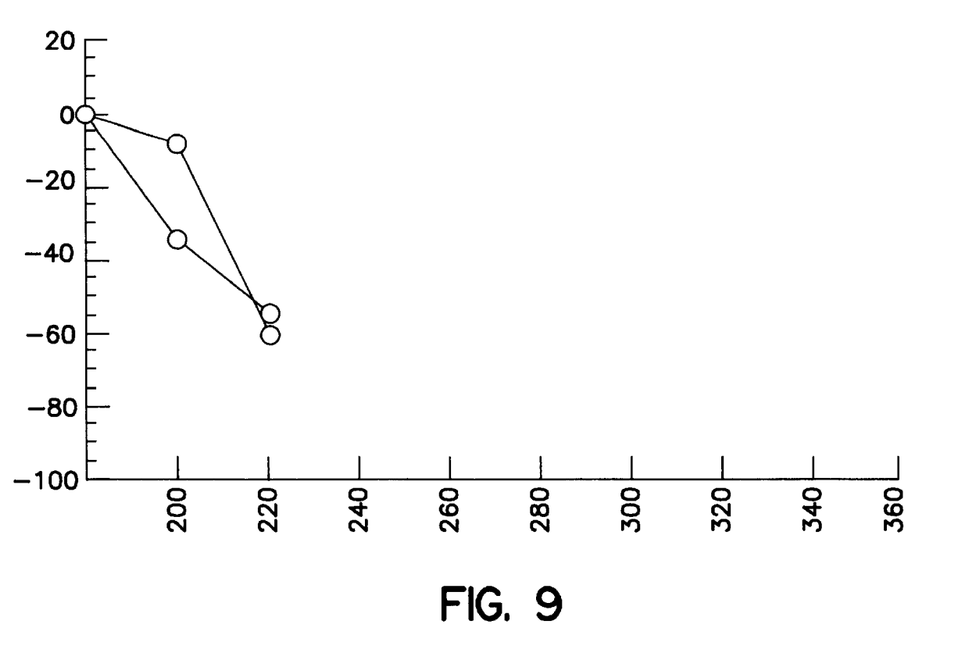
FIGS. 9, 10 and 11 are graphs of the aging of capacitors under DC voltages increasing in steps every 24 hours.
Figure 10:
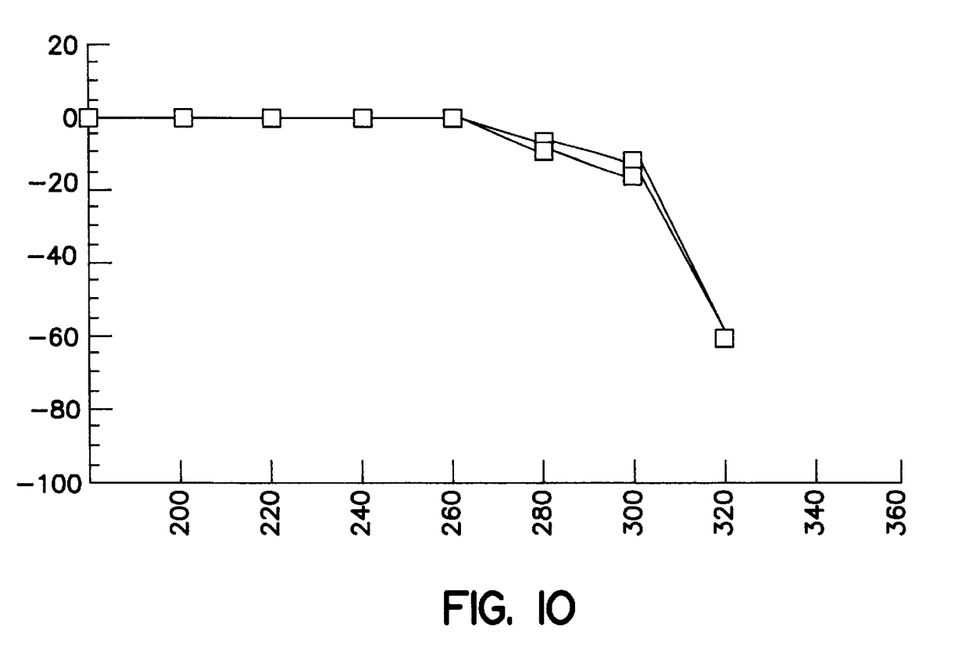
Figure 11:
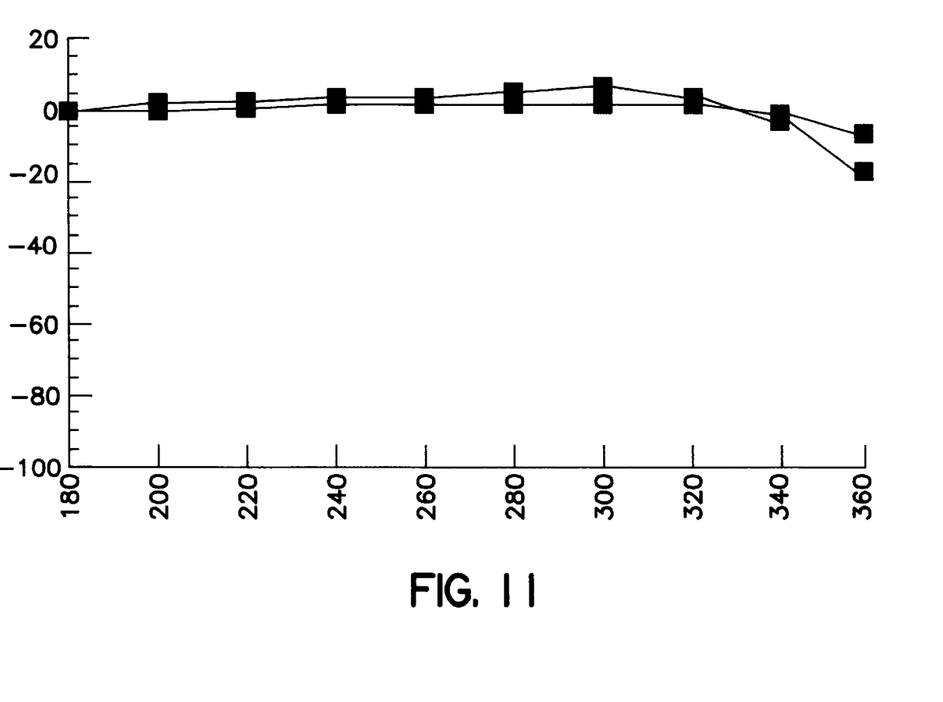

| TEST | IMPREGNATING COMPOUNDS | | | | | | FIGURES | |
|------|------|------|------|------|------|------|------|------|
|      | Liquids | | | | | | No. | Symbol |
| 20 (NC) | C100 | | | | | | 9 | --o-- |
|      | Crosslinkable compositions | | | | | | | |
|      | DBS (%) | DOP (%) | D9 (%) | Tolonate (%) | PolyBd (%) | DBTL (ppm) | No. | Symbol |
| 21 | 93.63 |       |       | 0.85 | 5.52 | 5 | 10 | --□-- |
| 22 |       | 18.69 | 74.76 | 0.82 | 5.73 |   | 11 | --■-- |

The preceding examples can be repeated with similar success by substituting the generically or specifically described reactants and/or operating conditions of this invention for those used in the preceding examples.

The entire disclosure of all applications and publications, cited above, and of corresponding French application No. 96/07631, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

We claim:

1. In a process for producing self-healing capacitors comprising impregnating at least one insulating fluid into wound coils of metallized polymer films the improvement wherein said insulating fluid comprises a, crosslinkable composition comprising at least one polydiene polyol, at least one polyisocyanate and at least one chemically inert liquid charge.

2. A process according to claim 1, wherein the insulating fluid comprises a tri(6-isocyanatohexyl) isocyanurate.

3. A process according to claim 1, wherein the insulating fluid comprises said polydiene polyol, the latter being a hydroxytelechelic butadiene oligomer of number-average molar mass at most equal to 7000, and having a functionality ranging from 1.8 to 3.

4. A process according to claim 1, wherein the insulating fluid is a crosslinkable composition comprising at least one polydiene polyol, at least one polyisocyanate having a functionality greater than 2 and an amount of inert liquid charge at least equal to 80% by weight of the composition.

5. A process according to claim 1, wherein the insulating fluid comprises a polyisocyanate selected from the group consisting of aromatic, aliphatic and cycloaliphatic polyisocyanates, and polyisocyanates containing an isocyanurate ring having at least two isocyanate functional groups.

6. A process according to claim 4, wherein the inert liquid charge is selected from the group consisting of alkylbenzenes, aliphatic esters, alkyl phthalates and vegetable oils.

7. A process according to claim 6, wherein the inert liquid charge is dodecylbenzene.

8. A process according to claim 6, wherein the inert liquid charge is dibutyl sebacate.

9. A process according to claim 6, wherein the inert liquid charge is dioctyl phthalate.

10. A process according to claim 6, wherein the inert liquid charge is colza oil.

11. A process according to claim 1, wherein the polyisocyanate is selected from the group consisting of aromatic, aliphatic and cycloaliphatic polyisocyanates, and polyisocyanates containing an isocyanurate ring having at least two isocyanate functional groups.

12. A process according to claim 11, wherein the polyisocyanate is a tri(6-isocyanatohexyl) isocyanurate.

13. A self-healing capacitor produced by the process of claim 1.

14. A self-healing capacitor produced by the process of claim 4.

15. A self-healing capacitor produced by the process of claim 3.

16. A self-healing capacitor produced by the process of claim 6.

17. A self-healing capacitor produced by the process of claim 5.

18. A self-healing capacitor produced by the process of claim 2.

19. A self-healing capacitor produced by the process of claim 11.

20. A self-healing capacitor produced by the process of claim 12.

21. In a process for producing self-healing capacitors comprising impregnating at least one insulating fluid into wound coils of metallized polymer films, the improvement wherein said insulating fluid comprises at least one polyisocyanate and a member selected from the group consisting of an aliphatic ester, an alkylbenzene and mixtures thereof.

22. A process according to claim 21 wherein said member is dioctyl sebacate, dioctyl adipate or dibutyl sebacate or mixtures thereof.

23. A process according to claim 22 wherein said member is dibutyl sebacate.

24. A self-healing capacitor produced by the process of claim 21.

25. A self-healing capacitor produced by the process of claim 22.

26. A self-healing capacitor produced by the process of claim 23.

27. A metallized polymer film impregnated with crosslinkable compositions comprising at least one polydiene polyol, at least one polyisocyanate and at least one chemically inert liquid charge.

28. A film according to claim 27 in the dried or crosslinked form.

29. A metallized polymer film impregnated with a insulating fluid comprising a polyisocyanate and a member selected from the group consisting of an aliphatic ester, an alkylbenzene and mixtures thereof.

30. A metallized polymer film according to claim 29 in a dried or crosslinked form.

* * * * *